United States Patent [19]
Frazier et al.

[11] 3,780,889
[45] Dec. 25, 1973

[54] GLASS BATCH FEEDER

[75] Inventors: John Earl Frazier; Clifford F. Crouse, both of Washington, Pa.

[73] Assignee: Frazier-Simplex, Inc., Washington, Pa.

[22] Filed: Nov. 9, 1971

[21] Appl. No.: 197,007

[52] U.S. Cl................. 214/33, 65/335, 214/18 GD
[51] Int. Cl............................................. C03b 3/00
[58] Field of Search.................. 214/18 GD, 23, 24, 214/32, 33; 65/335

[56] References Cited
UNITED STATES PATENTS
2,281,050  4/1942  Redshaw............................... 214/23
1,917,247  7/1933  Good............................ 214/18 GD

*Primary Examiner*—Robert G. Sheridan
*Attorney*—William H. Parmelee et al.

[57] ABSTRACT

There is disclosed a blanket type batch feeder for a glass melting furnace having one or more charger plates supported in such a manner that the angle of slope of the charger plate may be adjusted about an axis that substantially coincides with the lower edge of the sand seal at the rear of the supply chute. Also the charger plate may be swiveled about an axis normal to its surface to change its angle with respect to the longitudinal axis of the furnace which it feeds.

15 Claims, 9 Drawing Figures

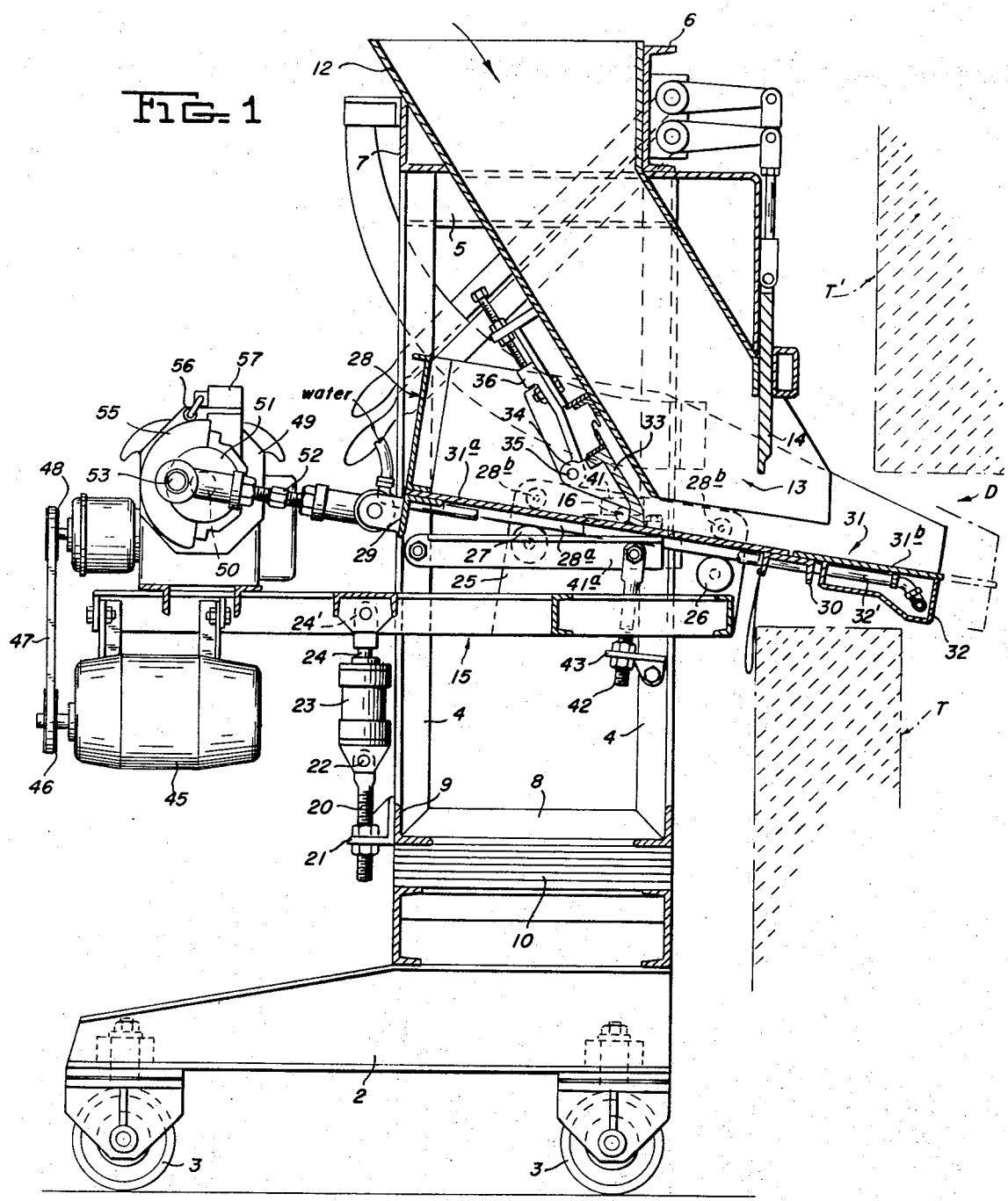

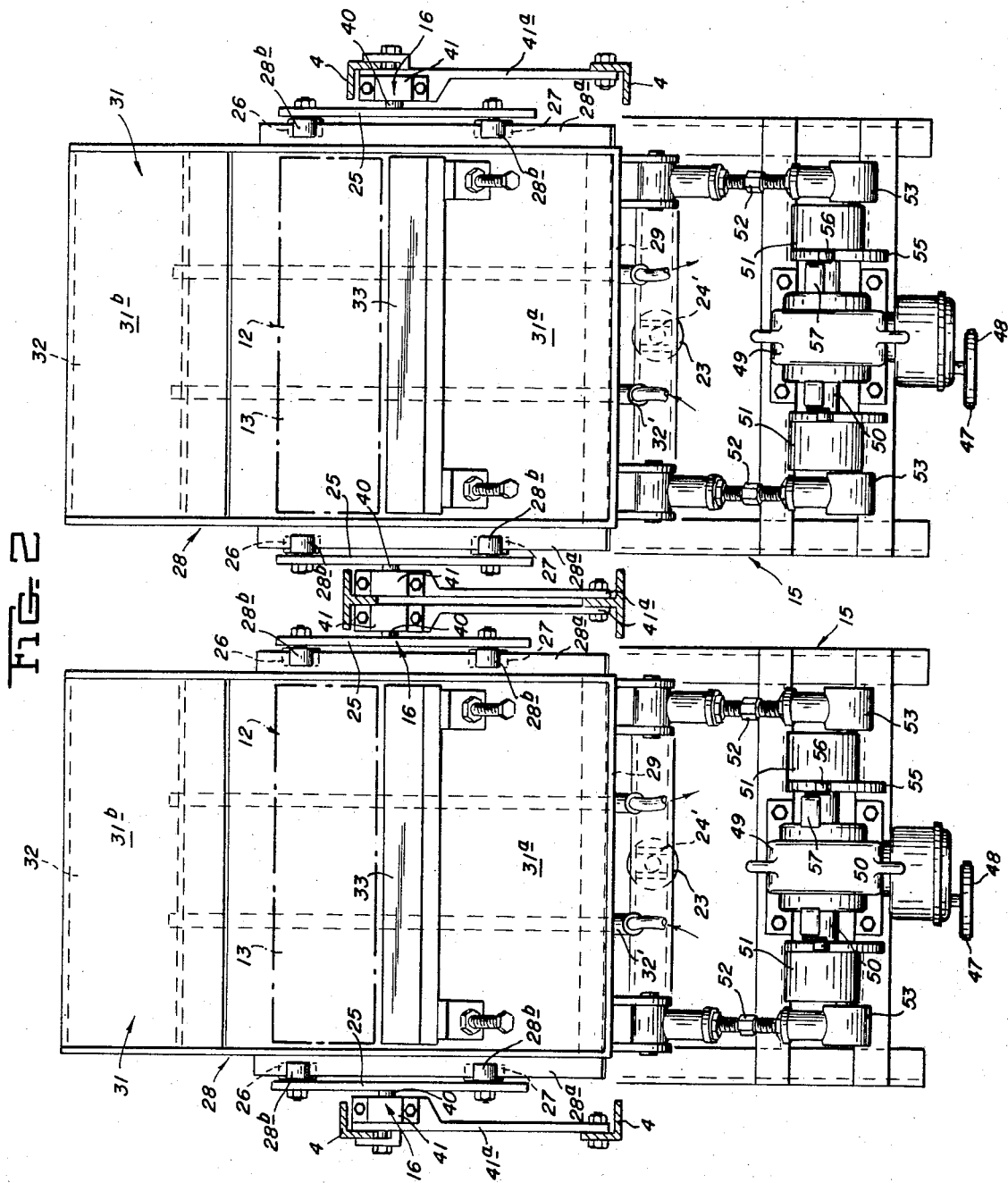

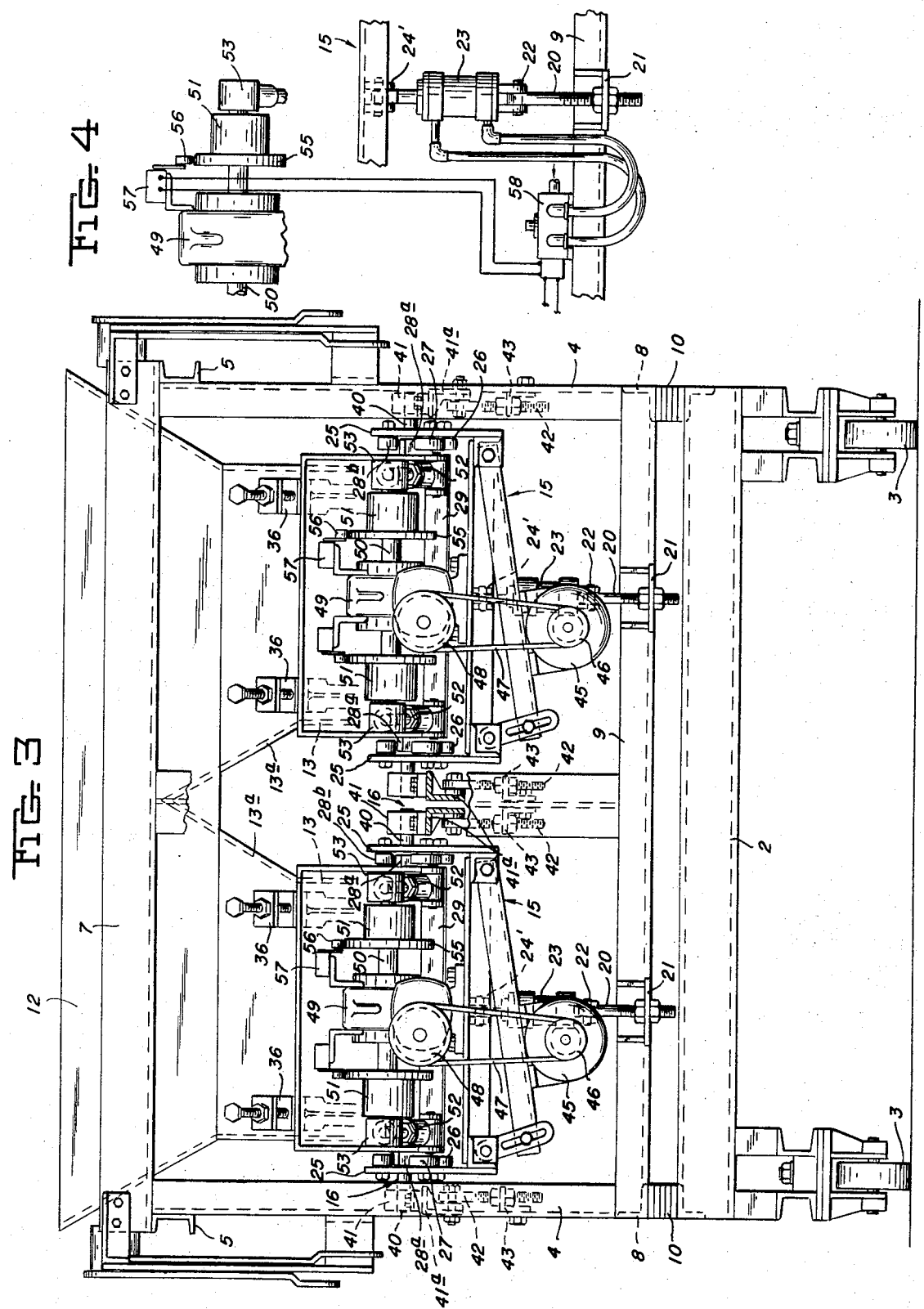

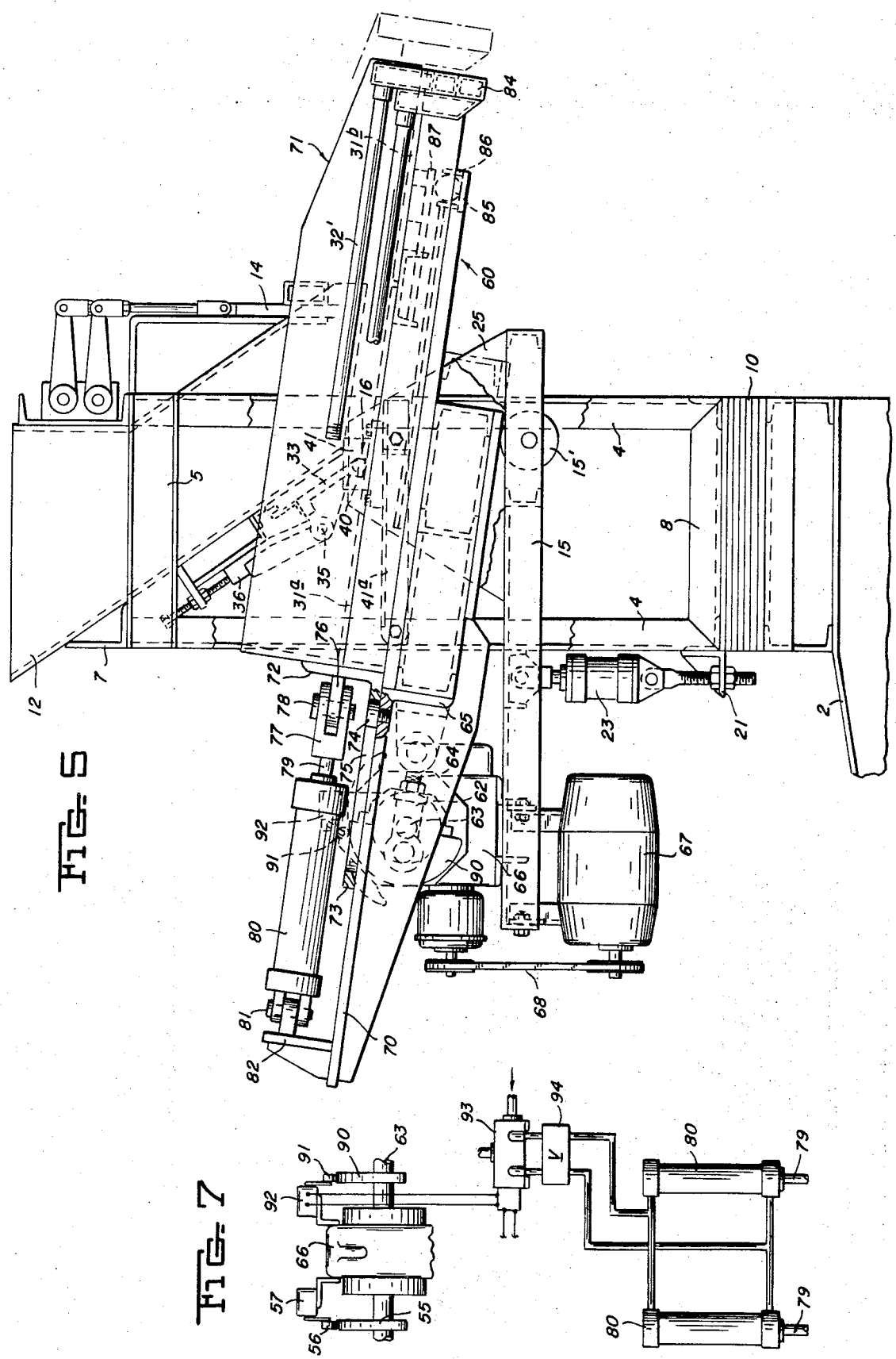

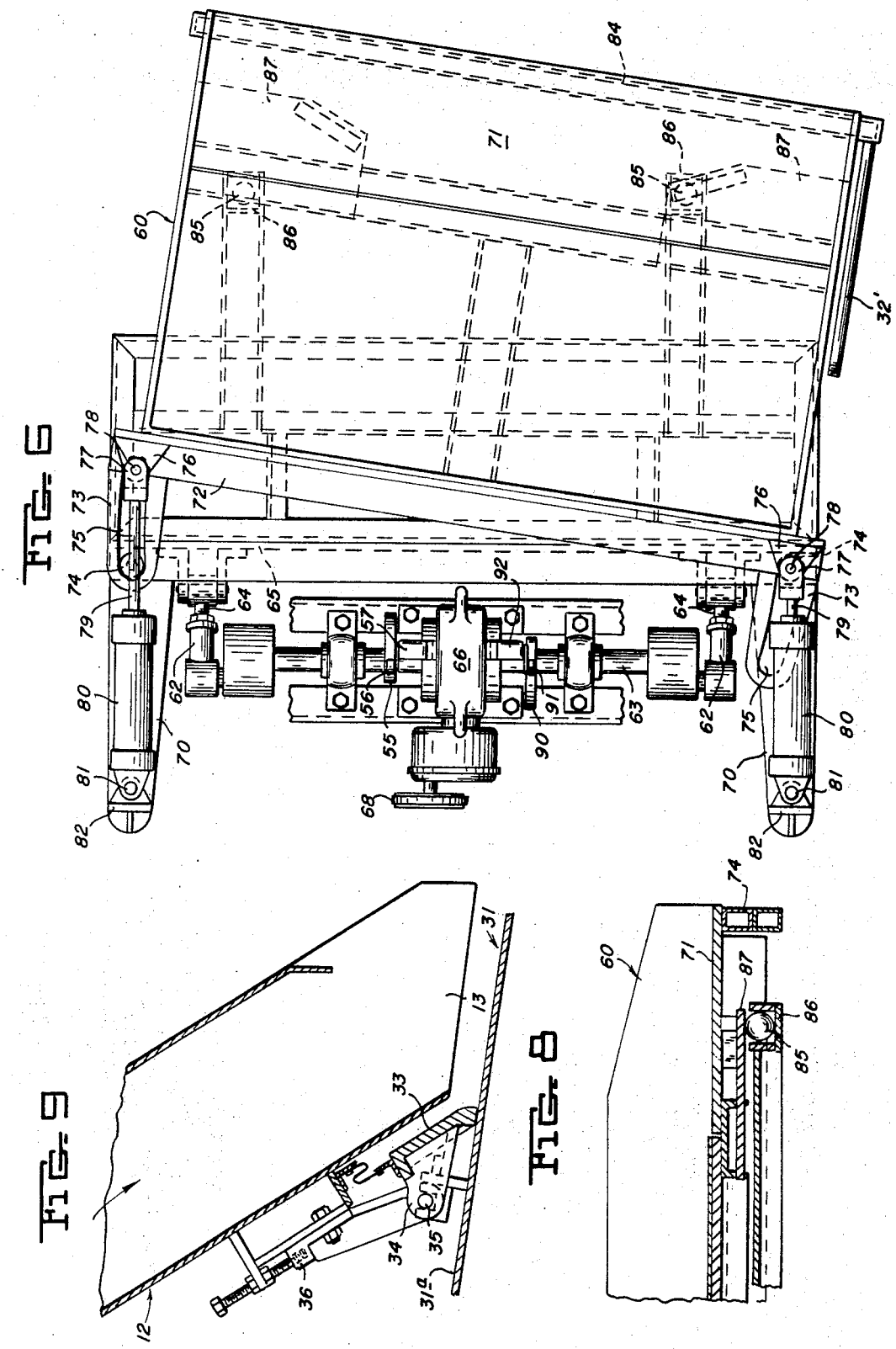

GLASS BATCH FEEDER

This invention is for an improved batch feeder for charging batch material into a glass melting furnace.

In continuous glass furnaces a mix of materials from which the glass is produced, commonly referred to as the batch, or batch material, is introduced into one end of a melting furnace and removed as melted glass from the opposite end, and there is maintained a nearly constant level of molten glass within the furnace. At the feed end of the tank the batch material is first melted in a melting zone and then there is a zone of relatively quiescent flow where the newly-formed glass is "fined" before it reaches the forehearth or opposite end from which the molten glass is removed for formation into a finished product, typically, flat glass, containers, or glass fiber. The quality of the glass depends largely on the uniformity of the melt and the efficiency of the furnace may vary considerably with rate and manner of batch feeding.

The melting end of the furnace is equipped with a charging bay generally referred to as the "doghouse" and for use with a so-called blanket batch charge feeder there is a suspended rear wall at the charging end of the furnace that is set inwardly from the rear wall of the doghouse, leaving a kind of open or semi-open trough between the rear wall of the charging bay and the inwardly-offset suspended wall, providing a doghouse across a substantial part of the full width of the furnace, sometimes as much as 20 feet or more in a wide furnace.

A blanket feeder, for which this invention is an improvement, has long been known in the art and is shown in U. S. Pat. No. 2,272,217. Basically it comprises a wheeled structural frame that supports an elevated hopper, the width of which is substantially coextensive with the width of the doghouse or trough-like furnace area into which material is fed. The bottom of the hopper provides a chute that terminates over a charger plate that is reciprocated toward and away from the doghouse, its stroke being adjustable, but being of the order of a few inches, possibly not more than 10 minutes, but usually less. This plate is supported in the frame at a level where it just clears the rear wall of the doghouse. As it moves forward beneath the chute, it carries a layer or blanket of batch material with it and as the charger plate pulls back the blanket is restrained from reverse travel by the so-called sand seal at the rear edge of the chute so that the batch material drops off into the doghouse where it initially floats on the molten glass in the tank.

The forward edge of the charger plate has a downwardly-projecting water-cooled lip thereacross, and depending on the angle at which the plate moves with respect to the horizontal on both its forward and return strokes, it pushes against and applies vertical components of pressure to the accumulated mass of floating batch material in the doghouse. Typically the plate may slope downwardly toward the glass level in the furnace at an angle of the order of 10° to 15° from the horizontal, but this may be more or less.

Instead of there being a single charging plate on a wide furnace there are more often two charger plates side-by-side, and there may be more than two. Each may have a separate drive for reciprocating it. Also it is not unusual to have the forward edge of the lower end of the chute provided with a plurality of vertically-adjustable gates. By adjusting these gates up or down with respect to the charger plate the thickness of the blanket on the charger plate can be regulated, and it may be thicker at some places across the plate than at others, or thicker on one plate than on the other or others.

While all continuous melting furnaces involve the feeding of the batch at one end of an elongate tank furnace and its removal as melted glass at the other with a fining zone between the two ends, the behavior of any furnace cannot be predicted and the quality of the glass, its clarity and the presence or absence of "seeds" or other imperfections is affected by such behavior, as is also the fuel consumption. Two furnaces of identical construction may manifest unpredictable variations in performance due to eddy currents, convective currents, flame flow and many other factors which are perhaps unknown. Sometimes a change of feeding the batch material may result in a noticeable fuel economy. It is because of this individuality of each furnace that two or more feed plates separately driven are favored in wide furnaces over a single wide plate, and is the reason for a series of adjustable gates across the hopper being preferred to a single adjustable gate. Adjustment of the inclination of the charger plate has heretofore also been provided, but this change of inclination changed the clearance between the plate and the bottom of the chute so as to impose practical limitations on its utility, or require a shut-down of the charger when an adjustment was needed.

The present invention has for its principal object to give the furnace operator a much increased variation in the feed so as to further adjust to the idiosyncracies of a particular furnace. It provides an arrangement wherein the charger plate may slope at one angle at all times or advance at one angle and retract at another or in a horizontal plane or even be vibrated. It also provides an arrangement where with two or more charger plates each may be individually oscillated about vertical axes of rotation whereby their respective center lines at the time of discharge may converge or diverge with respect to the center line of the furnace and with respect to each other or be in parallelism.

Preferably both of these features are combined in a single structure, but they are not necessarily so combined.

According to our invention the hopper is unchanged but the charger plate is mounted on a reciprocable frame which in turn is supported in such a manner on a platform that the frame and charger plate are reciprocated beneath the chute and the drive for effecting the reciprocation thereof is also mounted on this platform. With multiple charger plates there are preferably a multiple, two or more, such platforms side-by-side which together extend across the full width of the doghouse. Each platform is hinged in a supporting frame under the hopper for tilting about a transverse axis to thereby change the angle of the charging plate, and the pivoting axis about which the platform tilts is directly under the rear edge of the chute so that when the angle of slope of the charging plate is changed, the vertical distance between the plate and the rear edge of the hopper remains substantially constant. Means, such as a fluid pressure cylinder, is provided for selectively changing the angle of the platform. For example, in some furnaces the charging plate should slope downward toward the furnace on its forward stroke and retract on a level plane so that the action of the depending water-cooled lip on the forward edge of the charging plate against the floating batch material in the doghouse will be different than if the plate reciprocates in the same plane in both directions.

The reciprocating motion of the plate is transmitted to the plate from a power-driven eccentric connected through linkage with the reciprocal frame or carriage structure. At each side of this frame is a fluid pressure cylinder unit fixed to the frame and pivoted to the adjacent corner of the charger plate so that one cylinder ay be operated to thrust one corner of the charger plate forward while the other corner pivots on a vertical axis so that the plate may first be thrust forward, and then, while it is at its most forward limit of travel one of said fluid pressure cylinders may be operated to swivel the charger plate relative to the longitudinal axis of the furnace and thus change the angle of the forward edge of the depending water-cooled lip with respect to the accumulated batch material in the doghouse, much the same as a man with a paddle in the days of hand-feeding could move some of the accumulated charge in the doghouse relative to other such material. The direction of swing of the charger plate will depend on which of the two fluid pressure cylinders is activated.

Both of the foregoing options, that is, ready adjustment of the angle of the charger plate and/or change of its angle of slope on each cycle of operation and the swiveling of the plate about a generally vertical axis, may be and usually are combined, as hereinafter described, but either of these adjustments may be provided separately.

The invention may be more fully understood by reference to the accompanying drawings in which:

FIG. 1 is a somewhat schematic vertical transverse section through a blanket batch charger embodying our invention wherein provision is made for changing the angle of slope of the charging plate;

FIG. 2 is a top plan view of FIG. 1 with the hopper removed but its discharge opening indicated in dotted lines;

FIG. 3 is a rear view of the charger shown in FIG. 1;

FIG. 4 is a fragmentary view of a portion of the rear of the apparatus shown in FIG. 3 but on a larger scale together with a schematic fluid pressure circuit;

FIG. 5 is a view similar to FIG. 1 where the charger may selectively provide both of the above-described options;

FIG. 6 is a view similar to FIG. 2 embodying the arrangement of FIG. 2 together with the second option of swiveling the charger plate;

FIG. 7 is a view similar to FIG. 4 of the apparatus shown in FIG. 5;

FIG. 8 is a fragmentary vertical section through a ball support for the charging plate;

FIG. 9 is a fragmentary transverse section on a larger scale of the sand seal and lower end of the chute.

Referring first to the apparatus shown in FIGS. 1 to 4, the feeder has a supporting base structure 2 mounted on casters 3, as is customary with machines of this type for movement of the machine into and out of operating position adjacent the back wall T of the furnace tank. T' is the suspended rear wall of the furnace, the doghouse being designated D. In FIG. 1 the charger is in operating position with respect to the furnace and the charger plate is in its retracted position.

The supporting base structure has two upright columns 4 at each side thereof connected at their upper ends by side frame members 5 and the tops of the columns on one side are connected to the tops of the columns on the other side by a front channel section 6 and a rear angle section 7. At the base of the columns there are lower side frame members 8 and cross members 9. This upright framework comprising the columns and connection sections is here shown as having a series of metal strips 10 on the base under the side frame members 8. This enables the frame to be adjusted vertically with respect to the rear wall T of the furnace tank with which the charger is used simply by increasing or decreasing the number of spacing trips 10 at each side of the upright frame.

The frame supports a hopper 12 with a discharge chute 13 that slopes downwardly and forwardly toward the furnace. Where the feeder is a multiple plate feeder as here shown, there are divider plates 13a in the hopper to direct the material into the discharge openings over each plate. The width of the hopper from side to side is generally the full width of the dog-house. The front wall of the chute has a plurality of separately adjustable gates 14 across it, each with adjusting linkages and levers for raising and lowering them as indicated in the drawings, and which are commonly employed in the art.

All of the structure so far described is known and has heretofore been used. According to a preferred embodiment of our invention there is a platform 15 supported in the frame structure below the chute 13. It is pivotally supported in the frame structure near its forward end at the place indicated as 16 and hereinafter described in detail.

Rearwardly of the pivots 16 the platform is supported on one or more extensible and contractable support assemblies, each comprising a post 20 adjustable vertically on a bracket 21 carried on the cross member 9 at the rear of the bottom of the upright frame. The top of the post is pivotally connected at 22 with a fluid pressure piston and cylinder unit 23 having a piston rod 24 pivotally connected to ears 24' on the under side of the platform 15. There are preferably two of these support assemblies under each platform, one near each side. They provide two functions. First, by the screw adjustment of the post 20 on the bracket 21, the platform may be held level or tilted to a selected angle, and this is desirable even if the fluid pressure cylinder is not operated. Second, by operating the fluid pressure cylinder the platform may be rocked up and down between a low position determined by the initial adjustment of the post 20 in the bracket and an upper position when the piston of the cylinder and piston unit 23 is at the upper limit of travel in the cylinder. A preferred valving arrangement for operating the cylinder piston unit will be hereinafter described.

At each side of the platform 15 there is a vertical plate 25, each of which carries a forward roller 26 and a rear roller 27. These rollers provide a support for a reciprocable frame 28 having a bar 28a at each side so arranged that each bar rests on a forward roller 26 and a rear roller 27. This frame has a rear cross bar 29 and a forward cross bar 30. There are also hold-down rollers 28b above the bars 28a, as indicated.

There is a composite charger plate 31 fixed on this frame 28 having a rear section or plate 31a and a forward section or plate 31b. Section 31b has a lip 32 thereon which may be, but is not necessarily a hollow water-cooled nose piece. The lip is located under the forward edge of plate 31b and depends from it. There is a water inlet pipe 32' that discharges cooling water across the width of the lip, the lip having one or more outlets through which the water is discharged. Water-cooled lips of this character on charger plates are known in the art and details have not been shown.

The charger plate forms a bottom for the chute 13. The front wall of the chute with the adjustable gates 14 across it terminates above the plate 31a. The rear wall of the chute has a plate (see FIG. 9)33 across its lower edge, the plate having bracket members 34 on its read edge with pivots 35 on adjustable brackets 36. The location of the pivots 35 with reference to the hopper plate 33 is such that the lower edge of plate 33 is biased by gravity to bear at all times on the plate section 31a. The plate 33 so biased is known as the "sand seal." It tends to scrape sand on the plate free of the plate as the plate moves on the back stroke of its reciprocal travel.

In explanation of the pivot arrangement at 16, it will be noted (see FIG. 3) that the side plates 25 which carry the supporting rollers 26 and 27 each have a trunnion 40 projection laterally from its outer face. Each trunnion is engaged in a bearing 41 on pivoted arm 41a. There is a threaded post 42 supporting the free end of this arm for adjusting the arm and the bearing up or down. Each such post passes through a bracket 43 on one of the upright frame members and by adjusting nuts on the post below and above the bracket, the height of the bearing 41 can be changed. The bearings 41 can be adjusted vertically at the same time the posts 20 near the rear of the platform 15 are adjusted in the same direction and the platform 15 kept level while its height above the base can be changed, and by adjusting one set of posts relative to the other, the slope of the platform 15 can be changed. It will be seen, however, that the bearing 41 provides a pivotal support that is always directly under the lower edge of the sand seal plate 33 so that when the platform does pivot, either by adjustment of the posts 20 or by operation of the piston and cylinder unit 23, the charger plate will remain in contact with the lower edge of the sand seal because the point of contact of the sand seal with plate 31 is substantially coincident with the axis about which the platform tilts on trunnions 40.

Each platform 15 has an electric motor 45 suspended therefrom with a pulley 46 around which passes a belt 47 that drives a pulley 48 of a reducing gear indicated at 49. This reducing gear drives a horizontal shaft 50. There is an adjustable eccentric crank assembly 51 of a well known type at each end of this shaft 50 pivotally connected at 53 through an adjustable link 52 to the rear of the rear cross bar 29 at the rear of the reciprocable frame on which the charger plate is carried. By increasing or decreasing the eccentricity of the crank and correspondingly increasing or decreasing the length of the adjustable link 52, the length of the stroke or extent of reciprocal travel of the charger plate can be varied. On its forward travel the charger plate carries a layer or blanket of batch material out from under the chute of a thickness controlled by the distance between the plate and the adjustable gates at the front of the chute. When the charger plate retracts this material is crowded or pushed off into the dog-house over which the charger plate projects. Therefore the length of the stroke controls the amount of material charged into the furnace on each stroke.

It has been pointed out that the water-cooled lip 32 at the forward end of the charger plate stirs or puddles the accumulated material in the dog-house and that its angle of advance and withdrawal, as well as the amount of feed on each stroke and frequency of stroke is an important factor in securing optimum performance of the furnace.

In addition to the eccentric cranks 51 on the shaft 50 there is a cam 55 on this shaft. There is a fixed cam follower 56 that cooperates with this cam to operate a switch 57. The operation of this switch controls an electromagnetically-operated four-way valve unit 58 (see FIG. 4) through which fluid pressure, preferably compressed air, is supplied to one end or the other of the cylinder-piston units 23 to change the slope of the frame 28 and the charger plate supported thereby in timed relation to the travel of the charger plate and thus modify the puddling action of the water-cooled lip. Typically, at least on some furnaces, the charger plate will move forward at a fairly steep angle, then be lowered at the forward limit of its travel to a generally level or horizontal position and retracted to be raised again to the inclined position before its next forward stroke. However, by shaping the cam to different contours the charger plate can be oscillated up and down in slow or rapid succession or otherwise manipulated. As pointed out above, this changing of the angle of slope of the charger plate makes no practical change in the relation to the tip of the sand seal plate 33 to the charger plate because of the position of the pivot arrangement 16 for the platform 15, making it unnecessary to change the position of the sand seal each time the angle of the charger plate is changed.

With the arrangement as herein described wherein the charger plate and the drive for reciprocating it are both carried on a tilting platform it becomes possible to change the slope of the charger plate while the feeder is operating and to oscillate the feeder in a vertical arc in the manner described with each operating cycle of the charger plate but the operation of the cylinder and piston unit one or more times with each cycle of travel of the charger plate is optional. It is important moveover that by pivoting said platform close to and under the sand seal the change of the angle of travel of the charger plate requires no adjustment of the sand seal at the rear edge of the chute that deposits the material on the charger plate. The relation of the charger plate with respect to adjustable gates at the forward edge of the chute does change with a change in slope of the platform and charger plate but this poses no problem since the change usually takes place when the charger plate is at one limit or the other of its travel or adjustment of the gates may quickly be made to compensate for any increase or decrease in the amount of batch material because of a change of angle at some particular time in the cycle.

Our invention further contemplates that the charger plates may be swiveled about an axis normal to the plane of the charger plate, preferably in conjunction with the above-described arrangement or separately therefrom. This phase of our invention is hereinafter described in detail as a further modification of the structure above described but may be embodied in a conventional blanket type feeder whether it has the tilting platform arrangement here described or not.

As herein described and shown in FIGS. 5, 6 and 7 the frame, hopper, and tiltable platform are substantially the same as the construction herebefore described and the same reference numerals indicate the corresponding parts.

In this arrangement the reciprocable frame 60 corresponds to the reciprocable frame 28 of the construction first described and it is reciprocated in the same manner by two adjustable cranks 62, one at each end of shaft 63 and adjustable links 64, that connect the cranks with rear frame bar 65. This shaft extends from each side of a centrally positioned gear box 66 and there is a driving motor 67 transmitting power to the gear box through a belt or chain 68. The platform 15 in this case has a roller 15' near its forward end on which the front or lower end of the reciprocable frame 60 is supported for back and forth travel. This roller replaces the rollers 26 and 27 in the form previously described.

At each side of the reciprocable frame 60, that is, at each end of the rear cross bar 65 of the frame 60 there is a rearwardly-projecting extension 70. The composite charger plate is designated 71 and it has a cross bar 72 of angle section at its rear end. The cross bar 72 has a slotted extension 73 thereon that rests on the extension 70 of the reciprocable frame and a roller 74 on the extension 70 has a working fit in slot 75 of the extension 73. The cross bar 72 of the charger plate assembly also has a lug 76 thereon above its extension 73 at each end of the bar 72. A clevis 77 is pivotally connected at 78 with this lug. The clevis 77 is on the end of a piston rod 79 having a piston (not shown) in a fluid pressure cylinder 80. The end of the cylinder 80 opposite the one from which the piston rod extends is pivotally anchored at 81 to a bracket 82 on the rear end of the frame extension 70.

By energizing the cylinder 80 at one side of the frame while the other one is not operated, one rear corner of the charger plate can be pulled backward, relatively to the other and thereby oscillate the charger plate about one pivot 78 or the other on an axis normal to the surface of the charger plate, and thereby position the water-cooled lip 84 at the forward end of the charger plate diagonally with respect to the dog-house, as indicated in FIG. 6. By alternating the operation of one cylinder 80 and then the other, the water-cooled nose may be oscillated over the dog-house.

To facilitate the swiveling motion of the charger plate, particularly near its forward end where the amplitude of oscillation is greatest, there are balls 85 in retaining sockets 86 on the front and the underside of the charger plate has a bearing plate 87 fixed thereto, one of them being positioned to ride on each ball. It is contemplated that the balls 85 be made of dense carbon to withstand the high temperature over the dog-house and adjacent thereto and still rotate freely. Usually the arc of movement of the charger plate will not exceed about 10° each side of a centered position, but the exact range may be adjusted as further research with different furnaces is conducted.

The swiveling of the charger plate may be controlled by cams 90 on the drive shaft 63 similar to the cam 55 above described and a follower 91 similar to follower 56 and on the same shaft. Cam 90 is for operating a switch 92 to electromagnetically effect the operation of a four-way valve unit 93 through which fluid pressure is supplied alternately to one end and then the other of one of the cylinders 80 following the usual manner of operating such cylinders and as explained in connection with FIG. 4. Here, however, there is, in addition, a selector valve 94 such as a two-way valve which may be either manually or automatically operated to effect the operation of either one of the cylinders 80 while the other is held inactive. Also there may be provided a remote control for all functions where there are multiple plates that operate more or less sequentially, similar to remote control timers now used with multiple plate feeders.

The invention provides a method of an apparatus for feeding batch materials from a hopper wherein the slope of the charger plate may be changed without changing the relation between the charger plate and the sand seal. Further, it selectively enables the slope of the charger plate to be changed during operation and even during each cycle of operation. In addition or alternatively, it provides an arrangement wherein each charger plate may swivel relatively to the dog-house either toward or away from the center line of the machine or even alternately. While accomplishing these functions, it does in some respects simplify the overall construction of the feeder especially by mounting the charger plate and its drives and plate operating means all on the same supporting platform.

We claim:

1. A blanket type batch feeder for glass melting furnaces wherein there is a main supporting frame with a batch delivery chute therein, and a reciprocable charger plate under the delivery chute, there being a sand seal on the rear wall of the chute having a lower edge in sliding contact with the charger plate, the invention comprising:
    a. support means pivotally supported in the main frame for supporting the charger plate beneath the chute to effect pivoting motion about a horizontal axis whereby the slope of the support and charger plate with reference to the chute may be changed, said axis being so located with respect to the lower edge of the sand seal that the change of angle of the charger plate with respect to the lower edge of said seal remains constant
    b. and means on said support means arranged to reciprocate the charger plate at any angle of slope to which it is adjusted.

2. A blanket type batch feeder as defined in claim 1 wherein said support means comprises a platform structure under the charger plate hung from pivoted mounting means in the main frame in a position where the axis of tilt of the charger plate coincides with the lower edge of the sand seal.

3. A blanket type batch feeder as defined in claim 2 wherein there is means operatively interposed between the main frame and the platform for changing the angle of slope of the platform about said pivotal mounting and thereby change the angle of slope of the charger plate.

4. A blanket type batch feeder as defined in claim 3 wherein said last named means comprises means for varying the slope of the charger plate during each back and forth cycle of operation thereof.

5. A blanket type batch feeder as defined in claim 4 wherein said means for varying the slope of the platform and charger plate is a fluid pressure cylinder and piston unit with one element of said unit pivotally attached to the main frame and one to said platform rearwardly of the axis about which the platform pivots.

6. A blanket type batch feeder as defined in claim 4 in which said means for reciprocating the charger plate also controls the operation of said means for varying the slope of charger plate during each back and forth cycle of operation said charger plate.

7. A blanket type batch feeder as defined in claim 1 in which the charger plate is carried on a reciprocable frame which in turn is carried on said support means and the support means comprises a platform that is below the charger plate and frame but which is suspended from a pivotal mounting in the main supporting frame the pivotal axis of which is traverse the path of reciprocable travel of the charger plate in a line directly under the lower edge of said sand seal.

8. A blanket type batch feeder as defined in claim 7 wherein the charge plate is mounted on said reciprocable frame for swiveling movement about a pivoting axis normal to the surface of said plate, and means for effecting such swiveling motion of the plate relative to the frame.

9. A blanket type batch feeder as defined in claim 8 wherein there are cooperating means on the reciprocable frame and the charger plate for selectively effecting such swiveling movement of the charger plate.

10. A blanket type batch feeder as defined in claim 9 wherein the charger plate has a pivotal connection with the reciprocable frame sliding at each rear corner thereof and there is a fluid pressure cylinder and piston connection operatively interposed between each rear corner of the charger plate and the reciprocable frame whereby the charger plate may be selectively swiveled about the pivot unit at the other corner.

11. In a blanket type batch feeder for glass melting furnaces having a main supporting frame in which there is a batch feeding chute terminating directly above a charger plate that is reciprocated in a "fore" and "aft" direction under the chute with respect to the furnace with which it is used with the charger plate being always directly below the batch feeding chute, the invention comprising:
   a. a reciprocable frame on which the charger plate is carried back and forth under the batch feeding chute,
   b. means for reciprocating said frame, and
   c. a pivoted connection between the charger plate and the reciprocable frame about which the charger plate may be swiveled in a plane at right angles to the direction of travel of the reciprocable frame.

12. A blanket type batch feeder as defined in claim 11 wherein there is a power-operated means for effecting the swiveling movement of the charger plate relative to the reciprocable frame.

13. A blanket type batch feeder as defined in claim 11 wherein the charger plate is pivoted on the reciprocable frame in such manner that is may be swiveled to either side of the line of travel of the reciprocable frame.

14. A blanket type of batch feeder as defined in claim 11 wherein the charger plate is connected to the reciprocal frame by pivot means at each rear corner so arranged that the plate may be swiveled about either pivot means, and a fluid pressure means at each rear corner of the charger plate connected to the reciprocable frame whereby the charger plate may be selectively swiveled in one direction or the other by the selective operation of fluid pressure means at one corner or the other by operation of one or the other of said fluid pressure means.

15. A blanket type of batch feeder as defined in claim 11 wherein said reciprocal frame is supported for tilting adjustment of the reciprocable frame and charger plate about a transverse axis to change the angle of slope of the charger plate relative to the main supporting frame.

* * * * *